United States Patent [19]

Falco

[11] Patent Number: 4,790,114

[45] Date of Patent: Dec. 13, 1988

[54] MASONRY ANCHOR

[76] Inventor: Gene A. Falco, 34 Windemere Way, Woodbury, N.Y. 11797

[21] Appl. No.: 47,167

[22] Filed: May 7, 1987

Related U.S. Application Data

[63] Continuation of Ser. No. 880,287, Jun. 30, 1986, abandoned.

[51] Int. Cl.[4] .......................... E04B 1/41; E21D 20/02
[52] U.S. Cl. ..................................... 52/707; 405/261; 411/15; 52/743
[58] Field of Search ................................... 52/704–707, 52/743; 405/259–261; 411/15, 57, 23

[56] References Cited

U.S. PATENT DOCUMENTS

| 1,646,457 | 10/1927 | Ogden | 411/15 |
| 4,528,792 | 7/1985 | Gross et al. | 52/704 |
| 4,620,406 | 11/1986 | Hugel et al. | 52/704 |

FOREIGN PATENT DOCUMENTS

| 233091 | 3/1961 | Australia | 405/260 |
| 131319 | 6/1902 | Fed. Rep. of Germany | 52/704 |
| 2926155 | 8/1980 | Fed. Rep. of Germany | 405/261 |
| 60-43522 | 8/1985 | Japan | 405/260 |
| 2112487 | 7/1983 | United Kingdom | 411/23 |

Primary Examiner—James L. Ridgill, Jr.
Attorney, Agent, or Firm—Murray Schaffer

[57] ABSTRACT

An axially elongated performed tube having a leading end and a trailing end. The tube is restricted at its leading end and open at its trailing end for the insertion of an adhesive and a ram to extrude the adhesive. The tube is selectively divided along its length into a plurality of porous axial sections, each section having a porosity different from that of its adjacent section, enabling selected distribution of the adhesive in selected areas.

7 Claims, 2 Drawing Sheets

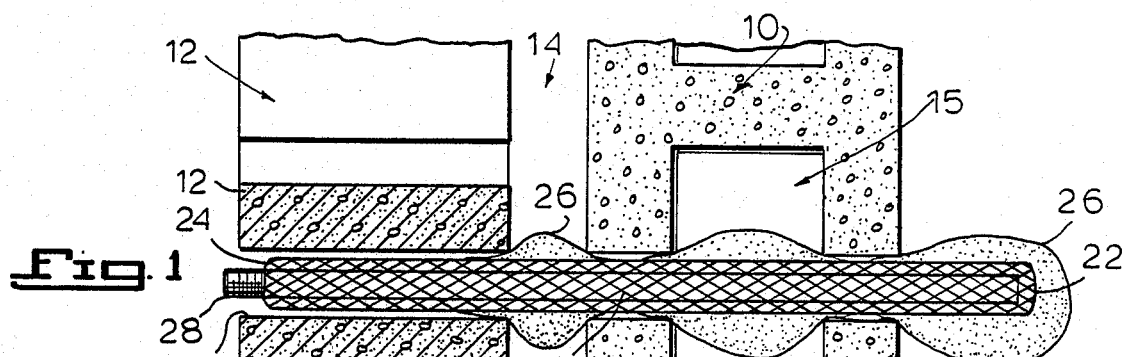
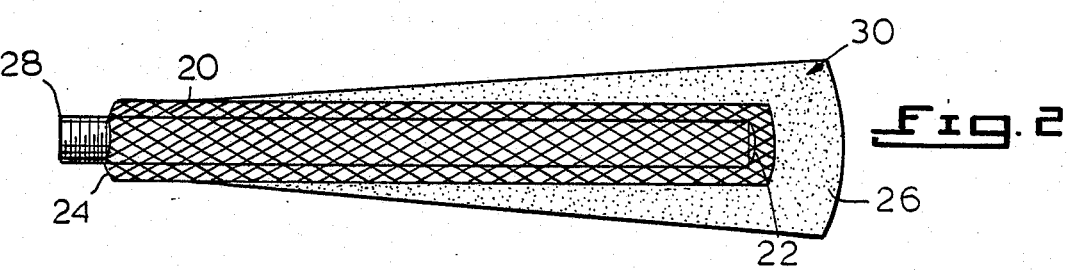
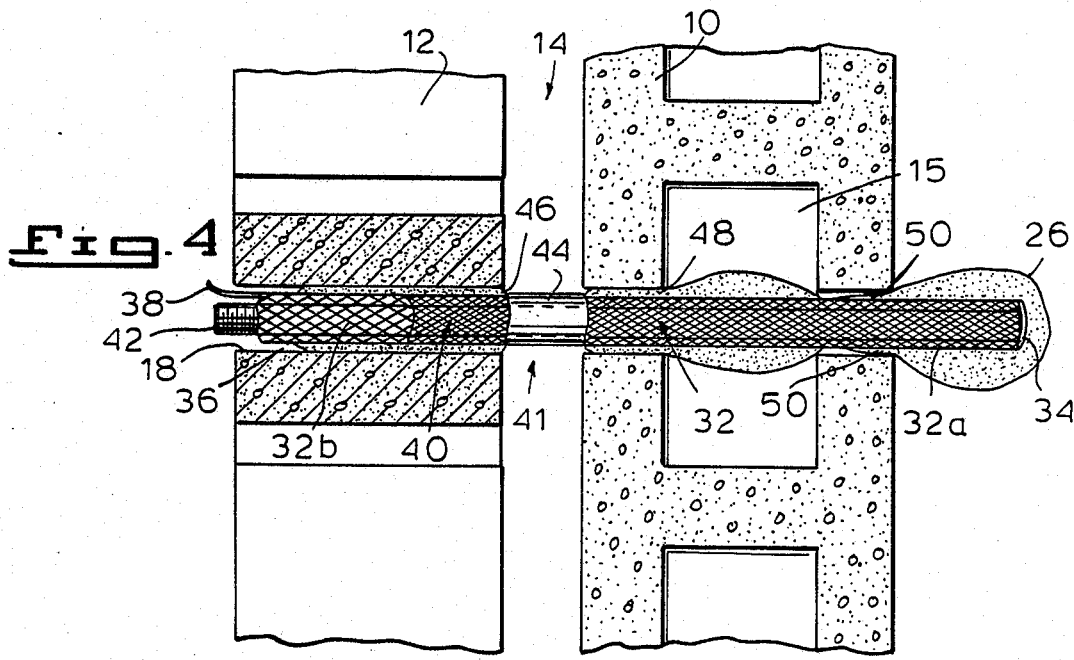

MASONRY ANCHOR

RELATED APPLICATION

The present application is a continuation of copending application Ser. No. 880,287 filed June 30, 1986 now abandoned, for which all benefits are claimed herein.

BACKGROUND OF THE INVENTION

The present invention relates to a method and device for anchoring and/or fixing masonry wall elements.

In much of masonry construction, two or more elements must be anchored or "pinned" together to strengthen them, either during initial construction, during subsequent repair, or during attachment of ancillary elements to the masonry structure. One such typical application, which also illustrates the prior art method and the curently used device is shown in FIGS. 1 and 2. Here, a concrete block wall construction 10 is faced with a brick facade 12, and a void 14 exists either by design or shift due to failure of original brick tie elements. Under prior art techniques, a hole 18 is drilled through both the facade 12 and the concrete block 10 into which a tubular hollow screen sleeve 20 is inserted. The sleeve 20 is restricted but not fully closed at its leading end 22 by overlapping the edge of the screen and is opened at its trailing end 24. Upon insertion, or even after insertion, the sleeve 20 is filled with a hardenable adhesive or cementatous mass 26. Prior to the hardening of the mass 26, a metal rod 28 or anchor is inserted into the sleeve so as to exert ram pressure on the adhesive mass forcing the material through the sleeve and radially outward.

It is of course, intended that the sleeve 20 permit the adhesive material 26 to be extruded radially therefrom into the holes 14 and 15, and to thus create an anchor involving the sleeve 20, the adhesive mass 26, the facade 12 and the concrete block 10. This, however, is only partially effective with the prior art devices. As will be seen from FIG. 1, very little adhesive material is extruded between the sleeve 20 and the facade 12. Therefore, insufficient anchoring is created between sleeve 20 and facade 12. It can be noted that sufficient material moves into the voids 14 and 15 and between sleeve 20 and block 10 forming an anchor between sleeve 20 and block 10.

The foregoing disadvantage arises from the fact that all of the known prior art sleeves are uniformly pervious, i.e., have a uniform mesh or hole distribution along their entire length and are at least in part open at their leading ends. As a result, as seen in FIG. 2, when the threaded rod 28 is inserted into the sleeve 20, the distribution of the adhesive, along the length of the tube, produces a conical taper indicated generally by the numeral 30 wherein the material moves freely and uniformly toward the leading edge rather than in a significantly radially direction through the sleeve. It is only when the pressure against the slug of adhesive material within the sleeve becomes so great, that the material is forced in any degree radially from the sleeve. This, occurs only toward the leading end of the sleeve. As a consequence of the conical pattern 30, it will be noted that very poor contact exists between the sleeve 20 and the facade 12 although it is precisely in this area, that the maximum adhesion is desired.

Illustrative of the prior art anchoring sleeve, is that shown in HUGEL, U.S. Pat. No. 4,620,406, which shows a sleeve formed of a wire screen having uniform mesh size along its entire length. This device also includes a collar at its trailing end which is adapted to make force-fit contact with the bore formed in the masonry so as to prevent overall movement of the sleeve during the extrusion of the hardenable mass. Uniform mesh or perforated sleeves are also shown in U.S. Pat. No. 4,528,792; U.S. Pat. No. 1,646,457. In British application No. 2,112,487 an anchoring sleeve like socket is formed having uniformly disposed open slots or perforations therein. The sleeve is filled with a adhesive material which is caused to effervesce in situ expanding through the slots or holes. This type of anchor is not subject to ram forces created by the anchoring rod.

It is an object of the present invention to provide an anchoring system in which better contact of adhesive is provided with the masonry than is currently possible, particularly when it is intended to attach or reattach the building facade to the base concrete block. This is absolutely necessary (see FIG. 1) when it is the object of the fastening to attach or reattach the building facade 12 to the base material 10 (brick, pored conceret, etc.) where no trailing end attachment is desired, such as a nut, roset, or other flange device.

It is a further object of the present invention, to provide an improved anchoring system in which a selective distribution of adhesive along the length of the anchoring tube is made. It is the particular object of the present invention to provide a screen sleeve for use with a hardenable adhesive and an anchoring bolt, for obtaining a brick to brick, block to block or brick to block masonry securement. (or any other masonry or stone elements).

The foregoing objects, together with additional objects and advantages will appear as the description proceeds.

SUMMARY OF THE INVENTION

In accordance with the present invention, a method and device is provided for anchoring masonry structures together, comprising the use of perforated tubular anchoring elements having a leading end and a trailing end. The tubular element is restricted at its leading end to prevent passage of adhesive material and open at its trailing end for the insertion of a hardenable mass of adhesive material. The adhesive material, is compressed by ram means to extrude the same radially from the tube. The tube is selectively divided along its length into at least two axial sections, in one section of which perforations are provided, in total, having a path of less resistance to axial extrusion than in the other section, thus enabling selection of relatively different amounts of adhesive material to be extruded from the selected lengths. Preferably, the section with the least resistance to axial extrusion to be located at the trailing end of the tube wherein, the initial ram action occurs.

Still further, it is preferred that the tube is formed of a cylindrically shaped wire screen and the difference in porosity and therefore, resistance to axial extrusion of adhesive, be provided by varying the mesh size in different axial sections of the tube.

In certain embodiments, it may be advantageous to separate sections by a band of relatively impervious material so that extrusion radially from the tube is prevented at such a point along the length of the sleeve. It is preferred that the leading end of the tube be closed completely as by setting a solid metal slug at the leading end.

It will be apparent, that the axial sections may be selected in any number and manner, particularly to conform to the type and size of the masonry structures on which it is used. By such selection, the sleeve can be provided so that selected amounts of adhesive material are extruded in selected axial sections within the structure so that the most advantageous and optimal securement may be obtained.

Full details of the present invention are set forth in the following disclosure and illustrated in the accompanying drawings.

BRIEF DESCRIPTION OF THE DRAWINGS

In the drawings:

FIG. 1 is a section view of a masonry construction showing the use of the prior art method and device, FIG. 2 is a view of the conventional prior art screen sleeve showing the normal distribution of the hardenable adhesive under action of the rod ram, FIG. 4, is a view of a wire mesh tube embodying the present invention.

DESCRIPTION OF THE INVENTION

Figure 3:
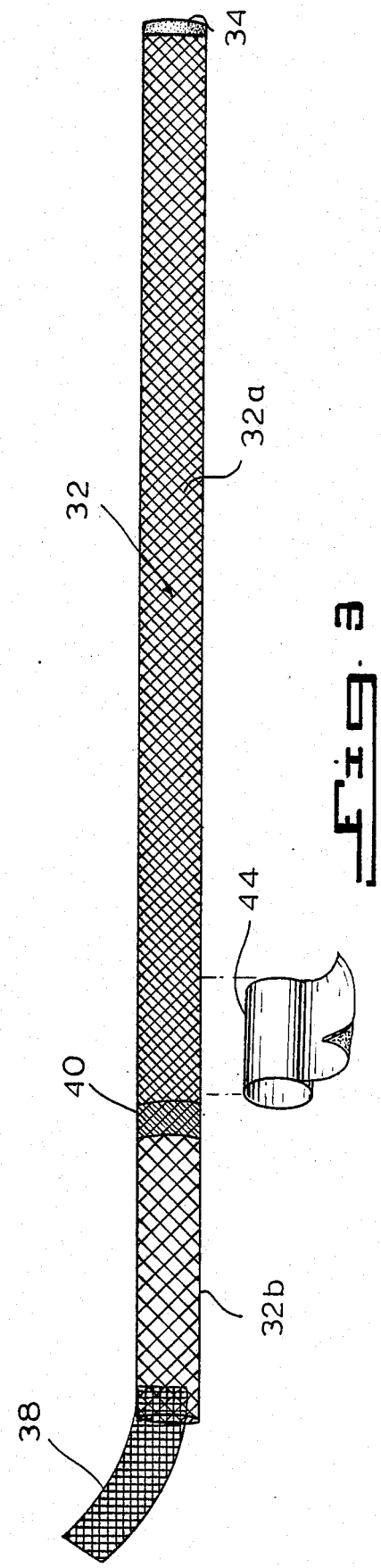
FIG. 3, is a view similar to that of FIG. 1 showing the method and device of the present invention in use.

By turning first to the description of the device for carrying out the present invention, as seen in FIG. 4, the method thereof may be more easily understood.

As seen in FIG. 4, the invention is embodied in a wire mesh tube generally indicated by the numeral 32, being closed at its leading edge by a solid slug 34, preferably soldered or welded into place, and open at its forward end 36 for the introduction of the anchoring rod 42 and/or slud element as desired. Extending forwardly from the trailing end 36, is a tab 38 which enables the tube 32 to be manually held for insertion into the masonry hole 18 and which enables the tube to be secured against axial movement under the force of the ultimately inserted anchoring ram. In accordance with the present invention, the tube 32 is divided into at least two axial sections, namely a forward section 32a and a trailing section 32b each of different mesh size and therefore of different perviousness or porosity. The forward section 32a has a smaller mesh size and thus a smaller open area than the trailing section 32b. The two sections 32a and 32b are joined, in the embodiment of FIG. 3 by a lapping seam 40 wherein the rear end of the smaller mesh section 32a overlaps the leading end of the larger mesh section on the exterior surface. The lap seam 40 is preferably welded, braised or otherwise joined together.

Preferably, the trailing section 32b (coarser mesh) does not extend too deeply axially along the tube 32. A section, somewhat less than the depth of the facade 12 is preferable, although this will actually be left to selection depending upon the structure being attached.

The use of the device as shown in FIG. 3 is illustrated in FIG. 4. The tube 32 is initially filled, in the normal manner, with adhesive material to the extent that no voids or air spaces are found in the filling. The filled tube is then inserted through the bore 18 and passed beyond the void 14 formed between the concrete block 10 and the brick facade 12 and fully through the concrete block 10, as is the prior art devices. A rod-like ram 42 and/or stud element is inserted into the trailing end. The ram 42 may be smooth or embossed as required for greater adhesion or holding power.

In any event, the ram 42 is inserted from the trailing end 36 toward the leading end 34 forcing the adhesive material 26 within the sleeve toward the forward end 34. Because the mesh at the trailing section 32b is substantially more coarse than that at the leading section 32a, the gel-like adhesive material is more easily extruded radially in the area of the facade 12, as at 46 even though the ram force and pressure duration is relatively small.

The larger holes in the coarse mesh section 32b at the trailing end 36 compensates for the short period of time and pressure duration, effected by the ram 42 in moving through the trailing end, as opposed to the larger period of time and pressure duration effected by the ram 42 at the leading end 32a of the sleeve. As a result, a less cone shaped and more uniform volume of the adhesive mass is extruded than otherwise possible with the conventional sleeve. As the ram 42 continues its movement, the adhesive material is pushed toward the leading end 34. Because of the more restricted wall 34 at the leading end of the tube, the axial flow of the material is inhibited thereby, the adhesive material backs up within the tube 32 causing it to flow readily in a radial direction rather than in the axial direction. This provides a significant radial flow of adhesive between the outer surface of the tube 32 and the solid surface of the concrete block 10, as seen at points 48 and 50 as well as within the hollow chambers 15 of the concrete block.

Consequently, greater adhesive contact is obtained between the brick facade 12 and the anchoring tube 32, as seen in FIG. 4. Compare this with the substantially lesser contact made in the prior art as seen in FIG. 1. This increased contact is effected without any waste of the adhesive material.

If one wants to insure against waste of adhesive material, and provide selected extrusion along the length of the tube 32, an impervious band 44, of metal, plastic tape or other means is wrapped about the sleeve. The band 44, as shown in FIG. 4 as being aligned at 41 with the void 14 between facade 12 and block 10, acts to blank out certain areas from receipt of adhesive, the position of the band or bands are selected, depending upon the nature of the structure to be anchored.

In a typical application such as a brick-tie repair, the tube of the present invention will be approximately 8 inches long having 6½ inches at its leading end constructed by a 20×20 inch mesh weave of 0.014 inches diameter stainless steel wire. The remaining 1½ inches at the trailing end is constructed by a 14×14 mesh weave of 0.017 inches diameter stainless steel wire. The lap seam is welded to join the two sections with the 20 mesh material lying exterially of the 14 mesh material. The tube, in order to accept a ⅜ inch ram and for insertion in a ½ inch hole, is formed using a 0.390 inch diameter welding mandrel. The tab at the trailing end can be made of any material, mesh or solid, being dimensioned in size to enable the user to hold on to the sleeve while it is being filled, and to secure the sleeve flush with the outside of the facade so that it is not axially movable during the ram extrusion process. Once the anchor is completed, the tab can be bent and stuffed into the hole.

The dimensions illustrated herein may of course, be varied depending upon the need for each particular application. Mesh sizes specified are for a thixotropic adhesive paste, common to most epoxies and polyester resins. Mesh sizes may also be varied depending upon the viscosity and/or thixotropy of the adhesive. Further, rather than using a wire mesh screen, a cylindrical tube formed of sheet material may be employed which is provided with holes, perforations, slots or foraminous openings in different discrete axial sections, having different open area sizes, rather than mesh. The tube may be formed of metal or plastic materials. The concept of the present invention is the use of a multi-mesh or multi-pervious sectioned tube in which discrete, axial sections have differently distributed openings or mesh sizes, which will achieve by a non-uniform axial distribution of hole sizes, mesh, etc., a uniform or selectively non-uniform axial distribution of adhesive so as to obtain more desirable and selective contact in the process of structural pinning and/or anchoring.

A further advantage of the present invention arises in combination with the ram, in that the ram more beneficially combines with the adhesive and forms a more integral part of the anchor, capable of absorbing and carrying loads placed on it by the brick and facade structure and/or other exterior facade attachments. In addition, the added adhesive at the trailing end increase contact with the ram minimizing any loosening effect that may be created by the load conditions.

Various modification, changes and embodiments have been disclosed herein, other such will be obvious to those skilled in the art. Accordingly, it is intended that the present disclosure be taken an illustrative only and not limiting of the invention.

What is claimed is:

1. Apparatus for performing in combination with a hardenable thixotropic adhesive, an anchor between spaced masonry elements comprising an axially elongated cylindrically shaped screen sleeve of a length sufficient to substantially pass through said masonry elements and, having a leading end and a trailing end, said screen sleeve being closed at its leading end with an impervious wall and open at its trailing end for the insertion of ram means adapted to extrude the hardenable mass through said screen, said screen sleeve being provided with at least two axial sections each having a different mesh size so as to selectively regulate the amount of hardenable adhesive extruded radially through said screen sleeve along the length thereof selectively filling the spaces between said masonry elements and the screen sleeve and within the masonry elements.

2. The apparatus according to claim 1, wherein said section having the greater porosity is located at the trailing end of said tube.

3. The apparatus according to claim 1, wherein said screen sleeve comprises a cylinder formed of sheet material provided with openings in each axial section uniformly distributed about the circumference.

4. The apparatus according to claim 1, wherein said screen sleeve is formed of a cylindrically shaped wire mesh, having a solid impervious plug at its leading end.

5. The apparatus according to claim 4, including an annular band of impervious material selectively located along the length of said wire mesh.

6. The apparatus according to claim 4, wherein said screen has a more coarse mesh size in the predetermined axial length adjacent the trailing end than in the remainder of said sleeve.

7. A method for securing masonry elements to a supporting structure, comprising the steps for forming a bore through the masonry element and supporting structure, forming an elongated perforated sleeve having defined axial sections of different perviousness, filling said sleeve with a hardenable thixotropic adhesive mass, and inserting said sleeve within said bore, thereafter inserting within said sleeve a ram, causing said hardenable mass to be extruded from said sleeve, filling selected areas of said bore radially adjacent the spaces within said masonry element and between said masonry element and the supporting structure with selective amounts of adhesive.

* * * * *